US012791686B2

(12) United States Patent
Yang

(10) Patent No.: US 12,791,686 B2
(45) Date of Patent: Nov. 10, 2026

(54) LIGHT RANGING AND DETECTION (LIDAR) BEAM-BY-BEAM CHARACTERIZATION

(71) Applicant: GM Cruise Holdings LLC, San Francisco, CA (US)

(72) Inventor: Yang Yang, Staten Island, NY (US)

(73) Assignee: GM Cruise Holdings LLC, San Francisco, CA (US)

( * ) Notice: Subject to any disclaimer, the term of this patent is extended or adjusted under 35 U.S.C. 154(b) by 858 days.

(21) Appl. No.: 18/093,304

(22) Filed: Jan. 4, 2023

(65) Prior Publication Data

US 2024/0219536 A1 Jul. 4, 2024

(51) Int. Cl.
*G01S 7/497* (2006.01)
*G01S 7/481* (2006.01)

(52) U.S. Cl.
CPC ............ *G01S 7/497* (2013.01); *G01S 7/4817* (2013.01)

(58) Field of Classification Search
CPC ........ G01S 7/497; G01S 7/4817; G01S 17/42; G01S 7/4972; G01S 17/931
See application file for complete search history.

(56) References Cited

U.S. PATENT DOCUMENTS

2019/0086550 A1* 3/2019 Dussan ................ G02B 26/108
2020/0284883 A1* 9/2020 Ferreira ................ G01S 7/4815
2020/0309957 A1* 10/2020 Bhaskaran .............. G01S 17/86
2021/0048516 A1* 2/2021 Rohatgi ................ G01S 7/4972
2022/0120905 A1* 4/2022 Wachter .................. G01S 7/484
2023/0266473 A1* 8/2023 Loot ..................... G01S 17/931 356/21
2023/0280451 A1* 9/2023 Chan ......................... G06T 7/80 702/104
2023/0305125 A1* 9/2023 Wang ...................... G01S 17/89

* cited by examiner

*Primary Examiner* — Dominic J Bologna
(74) *Attorney, Agent, or Firm* — Honigman LLP; Matthew H. Szalach

(57) ABSTRACT

Systems and techniques are provided for characterizing LiDAR sensors. An example method includes positioning a LiDAR device at a first position for directing a first LiDAR beam to a target, wherein the first position is based on a first elevation angle corresponding to the first LiDAR beam; obtaining a first beam measurement associated with the first LiDAR beam based on a first reflection corresponding to transmission of the first LiDAR beam using the first position; positioning the LiDAR device at a second position for directing a second LiDAR beam to the target, wherein the second position is based on a second elevation angle corresponding to the second LiDAR beam; obtaining a second beam measurement associated with the second LiDAR beam based on a second reflection corresponding to transmission of the second LiDAR beam using the second position.

20 Claims, 8 Drawing Sheets

LIGHT RANGING AND DETECTION (LIDAR) BEAM-BY-BEAM CHARACTERIZATION

BACKGROUND

1. Technical Field

The present disclosure generally relates to autonomous vehicles and, more specifically, to characterizing the performance of Light Ranging and Detection (LiDAR) sensors that are used on autonomous vehicles on a beam-by-beam basis.

2. Introduction

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow users to obtain sensor data that measures, describes, and/or depicts one or more aspects of a target such as an object, a scene, a person, and/or any other targets. For example, an image sensor can be used to capture frames (e.g., video frames and/or still pictures/images) depicting a target(s) from any electronic device equipped with an image sensor. As another example, a light ranging and detection (LiDAR) sensor can be used to determine ranges (variable distance) of one or more targets by directing a laser to a surface of an entity (e.g., a person, an object, a structure, an animal, etc.) and measuring the time for light reflected from the surface to return to the LiDAR.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
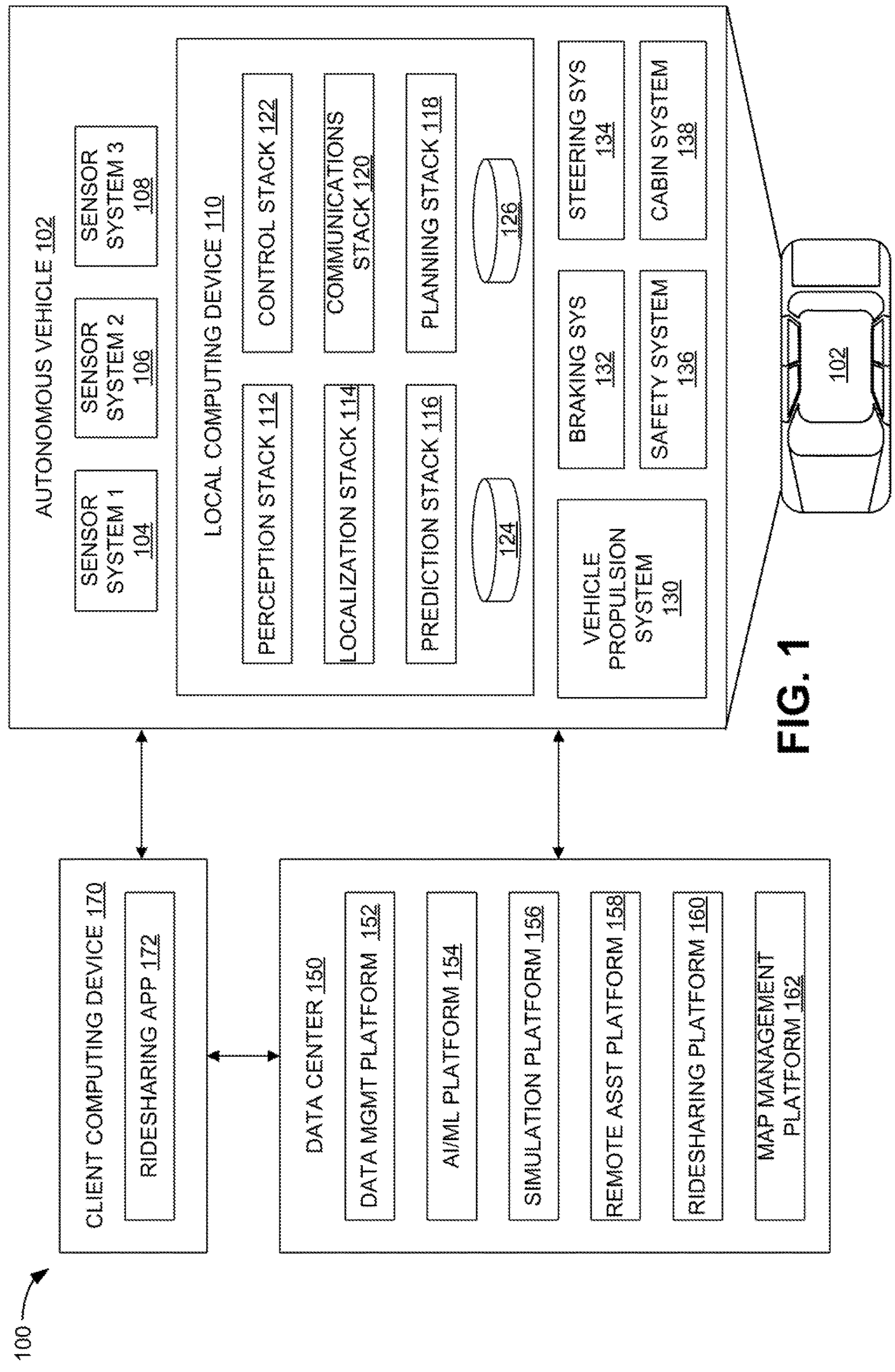
FIG. 1 is a diagram illustrating an example system environment that can be used to facilitate autonomous vehicle (AV) navigation and routing operations, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, sensors are commonly integrated into a wide array of systems and electronic devices. The sensors allow users to obtain sensor data that measures, describes, and/or depicts one or more aspects of a target such as an object, a scene, a person, and/or any other target. For example, an image sensor can be used to capture frames (e.g., video frames and/or still pictures/images) corresponding to a target. As another example, a Light Ranging and Detection (LiDAR) sensor can be used to determine ranges (variable distance) of one or more targets by directing a laser to a surface of an object (e.g., a person, a structure, an animal, etc.) and measuring the time for flight (e.g., time to receive reflection corresponding to transmission).

In some aspects, autonomous vehicles may use one or more LiDAR sensors to detect and identify surrounding objects (e.g., vehicles, pedestrians, buildings, traffic signals, cyclists, etc.). An autonomous vehicle may use the data from LiDAR sensors to predict the trajectory of objects within its environment and to help maneuver the autonomous vehicle (e.g., stop, accelerate, turn, etc.)

Typically LiDAR sensors include multiple channels that can each transmit and receive a LiDAR beam. In some cases, the different channels can transmit and receive beams in different directions. For example, a LiDAR sensor may have channels that are distributed vertically with varying spacing between each of the respective channels. In one illustrative example, a LiDAR sensor may include 128 channels that may be distributed over a vertical range of approximately 40 degrees. In some cases, different LiDAR channels may have different performance. For example, the range capability may vary among the different LiDAR channels. Furthermore, because a LiDAR device transmits numerous beams at once, testing and validating the performance of each individual channel can be difficult.

Systems and techniques are described herein for testing and characterizing a LiDAR sensor on a beam-by-beam basis. In some examples, a system may include a LiDAR device that is coupled to a positioning device such as a robotic arm and/or a gimbal. The positioning device may be controlled by a controller that can cause the positioning device to change the pose or position of the LiDAR sensor. In some cases, the controller can instruct the positioning device to move the LiDAR sensor such that the beam that is transmitted from the channel that is being tested is substantially parallel to a horizontal axis and is directed to a LiDAR target. In some aspects, the position of the LiDAR device can be based on an elevation angle that corresponds to the LiDAR channel that is under test.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170.

These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2A:
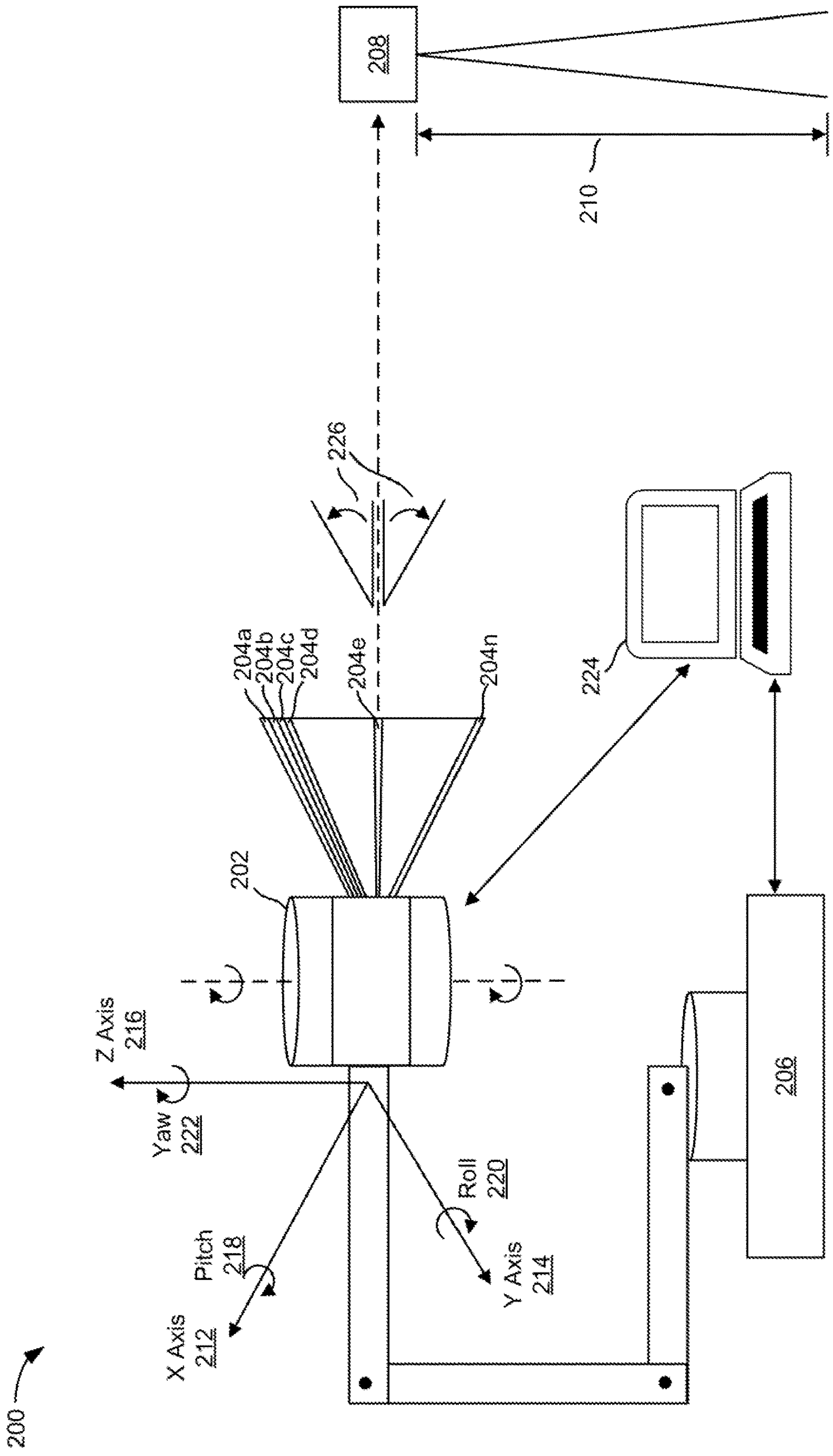
FIG. 2A illustrates a first configuration of an example system for characterizing a LiDAR device, according to some examples of the present disclosure.

FIG. 2A illustrates an example system 200 for testing and characterizing a Light Detection and Ranging (LiDAR) sensor. In some aspects, system 200 can include LiDAR sensor 202. In some examples, LiDAR sensor 202 may correspond to a LiDAR sensor that is used by AV 102 as part of sensor systems 104-108. In some cases, LiDAR sensor 202 may correspond to a rotating or spinning LiDAR sensor that is capable of capturing a 360-degree field of view. In some instances, LiDAR sensor 202 may correspond to a LiDAR sensor that is fixed in place and is directed in a single direction with a limited field of view (e.g., see LiDAR sensor 302 in FIG. 3).

In some aspects, LiDAR sensor 202 may be coupled to a positioning device 206. In some cases, positioning device 206 may include a gimbal, a robotic arm, an articulated arm, any combination thereof, and/or any other suitable positioning device. In some configurations, system 200 may include a controller 224. In some cases, controller 224 may include a laptop, desktop, tablet, mobile phone, and/or any other computing device that can be configured to communicate with positioning device 206 and/or LiDAR sensor 202. For example, controller 224 may include a computing device having an architecture that includes one or more components described herein with respect to FIG. 6.

In some examples, controller 224 may send instructions to positioning device 206 to move and/or position LiDAR sensor 202. For example, controller 224 may direct positioning device 206 to move LiDAR sensor 202 in one or more directions including movements corresponding to X-axis 212, Y-axis 214, Z-axis 216, pitch 218, roll 220, and/or yaw 222.

In some aspects, LiDAR sensor 202 may include a plurality of channels (e.g., 'n' number of channels or beams) such as channel 204*a*, channel 204*b*, channel 204*c*, channel 204*d*, channel 204*e*, and channel 204*n* (collectively referred to herein as "channels 204"). In some instances, each of the channels 204 can be associated with a transmitter and a receiver (e.g., a LiDAR beam transceiver) located within LiDAR sensor 202 (not illustrated). In one illustrative example, LiDAR sensor 202 may include 128 channels (e.g., LiDAR beam transceivers). In another illustrative example, LiDAR sensor 202 may include 64 channels. Those skilled in the art will recognize that the present technology is not limited to any particular number of LiDAR channels and/or any particular LiDAR sensor model.

In some cases, each of the channels 204 can be associated with a corresponding elevation angle 226. In some instances, the elevation angle 226 can correspond to the angle between a horizontal axis (e.g., horizontal reference axis or horizontal plane) and the position of the respective channel when LiDAR sensor 202 is in an upright position as illustrated in FIG. 2A. For example, the elevation angle 226 associated with channel 204*a* (e.g., 14.4 degrees) is greater than the elevation angle 226 associated with channel 204*b* (e.g., 13.5 degrees). As illustrated in FIG. 2A, the elevation angle 226 associated with channel 204*e* is approximately 0 degrees. In some aspects, the elevation angle 226 associated with channels that are beneath the horizontal axis may be a negative number (e.g., channel 204*n* may have an elevation angle 226 of −25.0 degrees).

In some examples, system 200 can be used to characterize one or more parameters associated with each of channels 204. For example, controller 224 can use the elevation angle 226 associated with one of channels 204 to position LiDAR sensor 202 such that the beam that is transmitted from the channel that is being tested is substantially parallel to a horizontal axis. In some cases, controller 224 can position LiDAR sensor 202 such that the beam that is transmitted from the channel that is being tested is directed to a LiDAR target such as target 208. For example, controller 224 can use positioning device 206 to position LiDAR sensor 202 such that a beam transmitted by channel 204*e* is parallel to a horizontal reference axis and is directed toward target 208. That is, in some cases, controller 224 can position LiDAR sensor 202 based on elevation angle 226 corresponding to a channel that is being tested (e.g., channel 204*e*) and target height 210 of target 208.

In some configurations, target 208 can be made from metal, plastic, fiberglass, retroreflective material, and/or any other material. In some examples, target 208 can have a size that is approximately 2 square meters. In some instances, target 208 can have a size that is approximately 3 square meters. However, those skilled in the art will recognize that the present technology is not limited to any particular size for target 208. In some cases, target 208 can have a known reflectivity value that can be used to test or characterize and/or measure one or more parameters associated with each of channels 204 of LiDAR sensor 202. For example, beam measurements associated with each channel can be used to determine a range capability parameter, a range accuracy parameter, an intensity parameter, a response time, any other LiDAR parameter, and/or any combination thereof.

In some aspects, controller 224 can determine whether a LiDAR parameter or measurement associated with one or more channels 204 of LiDAR sensor 202 is within a threshold value for a parameter or measurement associated with operation of an autonomous vehicle (e.g., AV 102). For example, the perception stack (e.g., perception stack 112) of an AV may be associated with one or more sensor parameter thresholds. In some cases, the sensor parameter thresholds can be used to ensure that the perception stack has sufficient time to obtain and process sensor measurements to identify objects and make routing decisions based on the objects surrounding the AV. For instance, the perception stack of the AV may require that a LiDAR sensor (e.g., LiDAR sensor 202) have a range capability that is greater than or equal to 100 meters in order to identify objects surrounding the AV in a timely fashion.

Figure 2B:
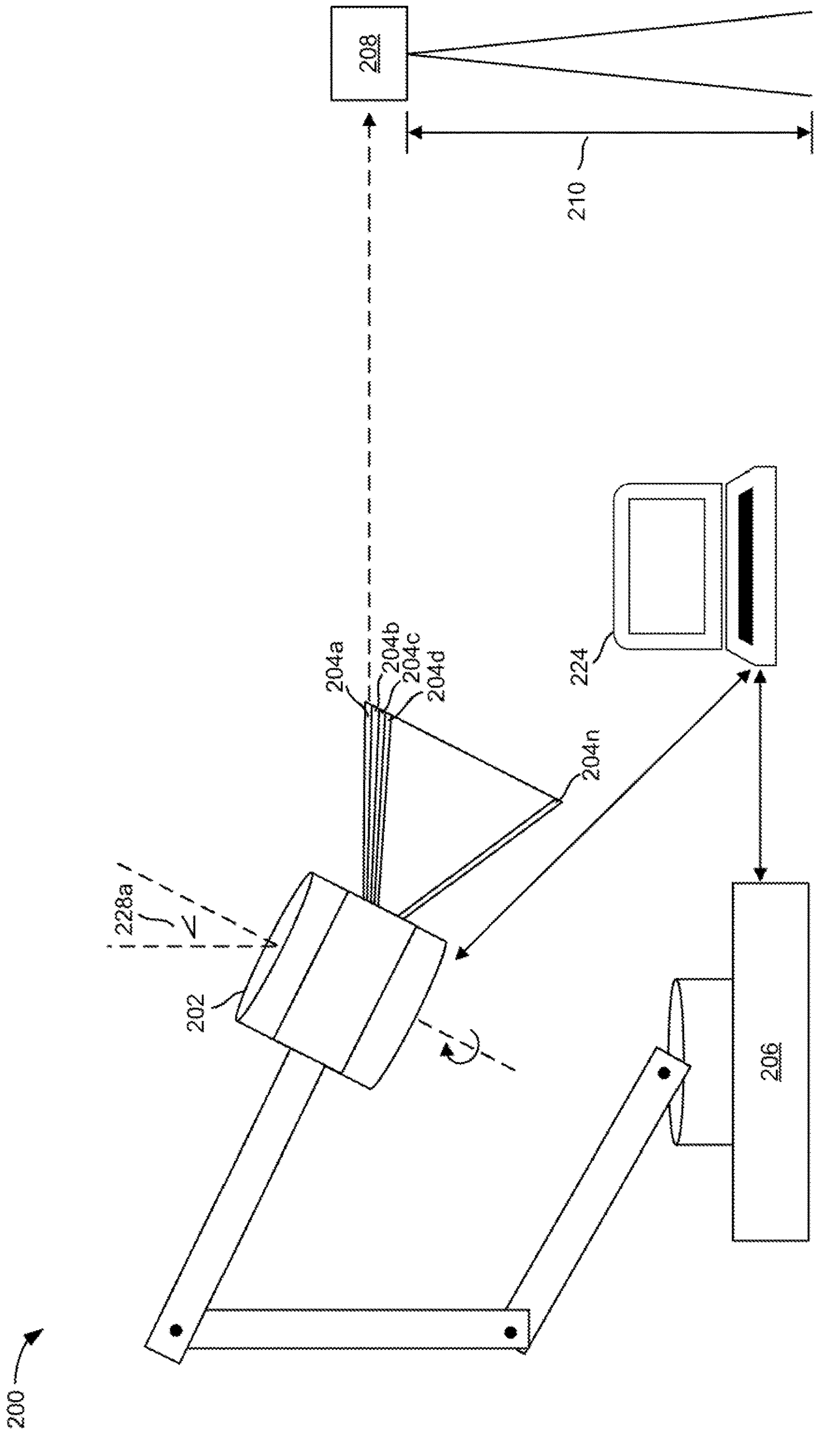
FIG. 2B illustrates a second configuration of an example system for characterizing a LiDAR device, according to some examples of the present disclosure.

FIG. 2B illustrates another configuration of example system 200 for testing and characterizing LiDAR sensor 202. As noted above, controller 224 can use the elevation angle 226 associated with one of channels 204 to position LiDAR sensor 202 such that the beam that is transmitted from the channel that is being tested is substantially parallel to a horizontal axis. In FIG. 2B, controller 224 has positioned LiDAR sensor 202 based on elevation angle 228*a* such that channel 204*a* is aligned with target 208. For example, controller 224 can configure positioning device 206 to tilt LiDAR sensor 202 down based on elevation angle 228*a* corresponding to channel 204*a*. In some aspects, a beam that is transmitted by a transmitter associated with channel 204*a* will be directed to target 208 and produce a reflected beam that can be received by a receiver that is associated with channel 204*a*.

Figure 2C:
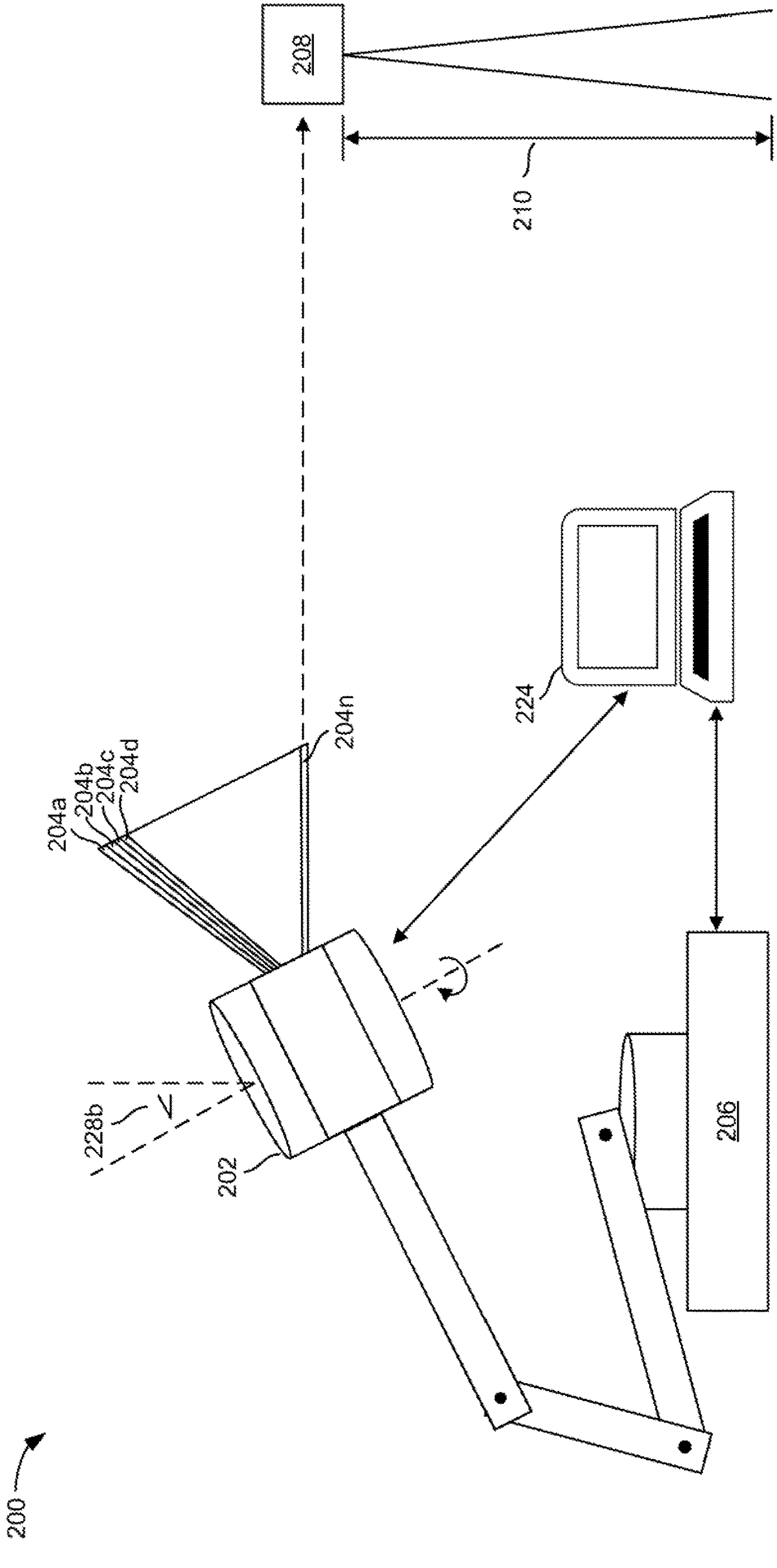
FIG. 2C illustrates a third configuration of an example system for characterizing a LiDAR device, according to some examples of the present disclosure.

FIG. 2C illustrates another configuration of example system 200 for testing and characterizing LiDAR sensor 202. As illustrated in FIG. 2C, controller 224 can position LiDAR sensor 202 based on elevation angle 228*b* such that channel 204*n* is aligned with target 208. For example, controller 224 can configure positioning device 206 to tilt LiDAR sensor 202 in an upward direction based on elevation angle 228*b* corresponding to channel 204*n*. In some aspects, a beam that is transmitted by a transmitter associated with channel 204*n* will be directed to target 208 and produce a reflected beam that can be received by a receiver that is associated with channel 204*n*. Although not illustrated, controller 224 may use the elevation angle 226 corresponding to each of the respective channels 204 position LiDAR sensor 202 (e.g., via positioning device 206) in order to test and characterize all of the channels 204.

Figure 3:
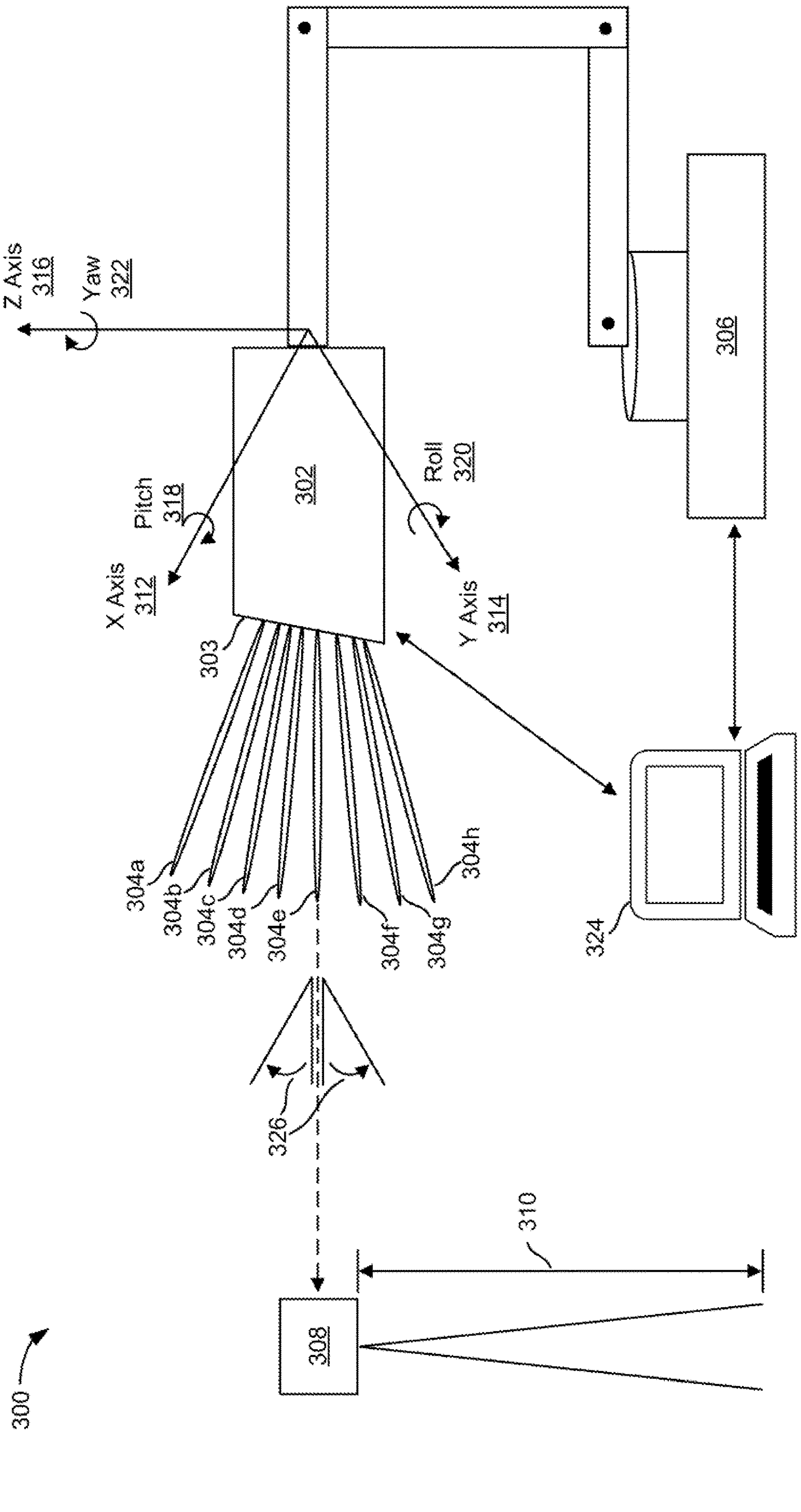
FIG. 3 illustrates another example of a system for characterizing a LiDAR device, according to some examples of the present disclosure.

FIG. 3 illustrates an example system 300 for testing and characterizing a Light Detection and Ranging (LiDAR) sensor. In some aspects, system 300 can include LiDAR sensor 302. In some examples, LiDAR sensor 302 may correspond to a LiDAR sensor that is used by AV 102 as part of sensor systems 104-108. In some cases, LiDAR sensor 302 may correspond to a LiDAR sensor that is fixed in place (e.g., solid state sensor directed in a single direction with a limited field of view). For example, LiDAR sensor 302 may include a forward-facing lens 303 having a field of view that is less than 360 degrees. For example, in some cases, the field of view of LiDAR sensor 302 may be between 90 degrees and 120 degrees.

In some aspects, LiDAR sensor 302 may be coupled to a positioning device 306. In some cases, positioning device 306 may include a gimbal, a robotic arm, an articulated arm, any combination thereof, and/or any other suitable positioning device. In some configurations, system 300 may include a controller 324. In some cases, controller 324 may include a laptop, desktop, tablet, mobile phone, and/or any other computing device that can be configured to communicate with positioning device 306 and/or LiDAR sensor 302. For example, controller 324 may include a computing device having an architecture that includes one or more components described herein with respect to FIG. 6.

In some examples, controller 324 may send instructions to positioning device 306 to move and/or position LiDAR sensor 302. For example, controller 324 may direct positioning device 306 to move LiDAR sensor 302 in one or more directions including movements corresponding to X-axis 312, Y-axis 314, Z-axis 316, pitch 318, roll 320, and/or yaw 322.

In some aspects, LiDAR sensor 302 may include a plurality of channels such as channel 304*a*, channel 304*b*, channel 304*c*, channel 304*d*, channel 304*e*, channel 304*f*, channel 304*g*, and channel 304*h* (collectively referred to herein as "channels 304"). In some instances, each of the channels 304 can be associated with a transmitter and a receiver (e.g., a LiDAR beam transceiver) located within LiDAR sensor 302 (not illustrated). In some examples, a channel may transmit one or more beams across a horizontal portion of lens 303. In some cases, an azimuth angle can be associated with different beams transmitted by a channel. For example, an azimuth angle of zero degrees can correspond to a beam that is transmitted from the center of lens 303.

In some cases, each of the channels 304 can be associated with a corresponding elevation angle 326. In some instances, the elevation angle 326 can correspond to the angle between a horizontal axis (e.g., horizontal reference axis or horizontal plane) and the position of the respective channel when LiDAR sensor 302 is in an upright position. As illustrated in FIG. 3, the elevation angle 326 associated with channel 304*e* is approximately 0 degrees.

In some cases, controller 324 can position LiDAR sensor 302 based on elevation angle 326 corresponding to a channel that is being tested (e.g., channel 304*e*) and target height 310 of target 308. In some examples, controller 324 can position LiDAR sensor 302 based on an azimuth angle (not illustrated) that can be used to rotate LiDAR sensor 302 (e.g., adjust yaw 322). In some cases, adjusting the azimuth angle (e.g., yaw 322) can be done to test different beams corresponding to a particular channel across a horizontal plane of lens 303. As noted above with respect to FIG. 2A, controller 324 can determine measurements and/or parameters corresponding to each of channels 304 such as a range capability parameter, a range accuracy parameter, an intensity parameter, and/or a response time parameter.

Figure 4:
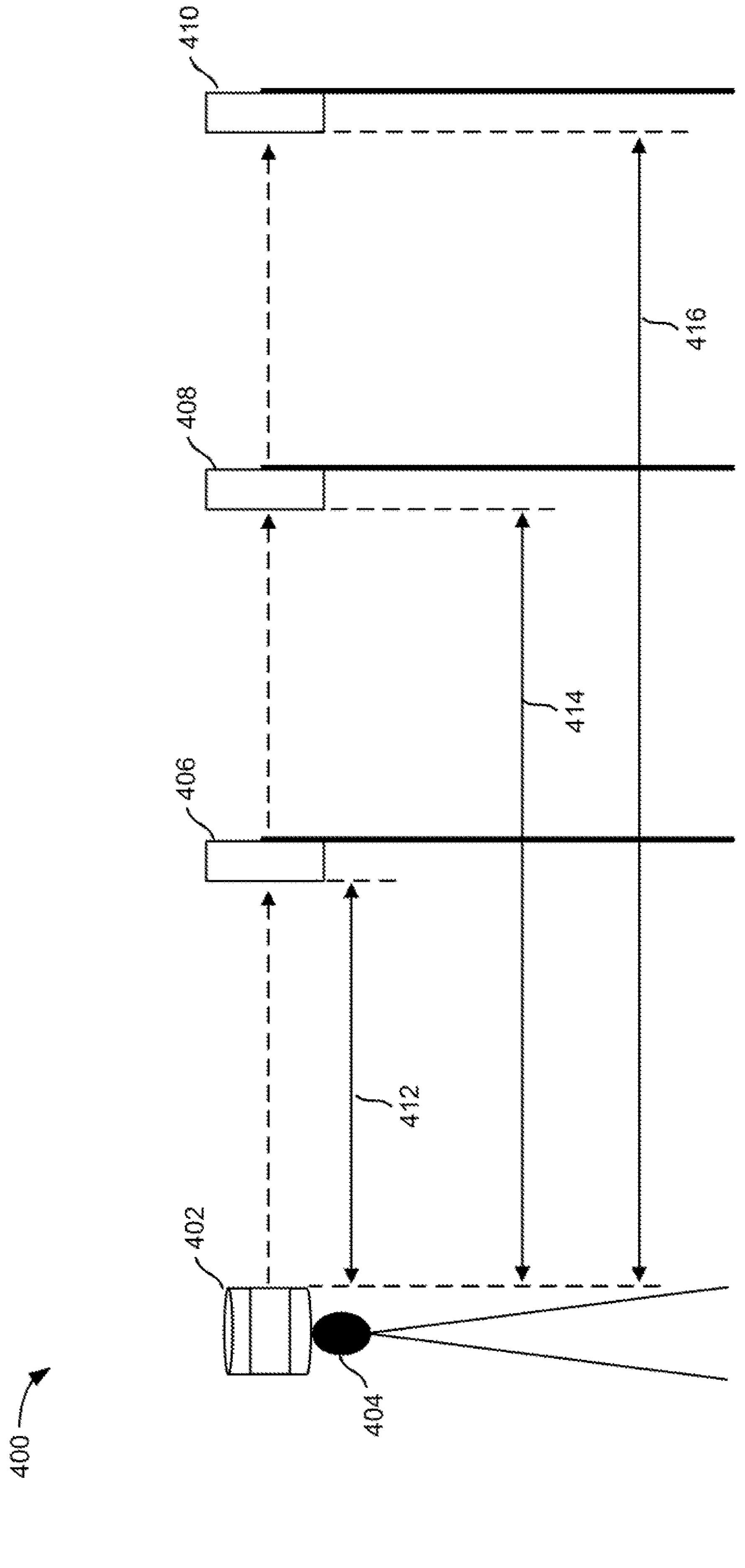
FIG. 4 illustrates another example of a system for characterizing a LiDAR device, according to some examples of the present disclosure.

FIG. 4 illustrates an example system 400 for testing and characterizing a Light Detection and Ranging (LiDAR) sensor. In some aspects, system 400 can include LiDAR sensor 402. In some cases, LiDAR sensor 402 may correspond to LiDAR sensor 202 and/or LiDAR sensor 302 (e.g., a rotating LiDAR sensor with 360 degrees field of view or a fixed LiDAR sensor with reduced field of view). In some examples, LiDAR sensor 402 can be mounted or coupled to a positioning device such as positioning device 404. In some cases, positioning device 404 may include a gimbal and/or a robotic arm that can be configured to adjust the position or pose of LiDAR sensor 402 in one or more directions (e.g., x-axis, y-axis, z-axis, pitch, roll, and/or yaw).

In some examples, system 400 may include one or more targets for testing LiDAR sensor 402. For example, system 400 may include a first target 406 that is positioned at a distance 412 from LiDAR sensor 402. In some cases, system 400 may include a second target 408 that is positioned at a distance 414 from LiDAR sensor 402. In some instances, system 400 may include a third target 410 that is positioned at a distance 416 from LiDAR sensor 402.

In some aspects, target 406 may correspond to a close-range target in which distance 412 is approximately 20 meters. In some cases, target 408 may correspond to a mid-range target in which distance 414 is approximately 80 meters. In some examples, target 410 may correspond to a long-range target in which distance 416 can be between 140 meters and 200 meters. In some cases, each of target 406, target 408, and target 410 may be positioned at approximately the same height (e.g., approximately 1.5 meters).

In some aspects, positioning device 404 can be portable (e.g., manually and/or automatically). For example, positioning device 404 may be moveable such that distance 412 to target 406, distance 414 to target 408, and/or distance 416 to target 410 can be increased or decreased during testing of LiDAR sensor 402. In one illustrative example, positioning device 404 can be moved or repositioned in one or more increments (e.g., 10 m increments) in order to test/characterize LiDAR sensor 402 at different ranges/distances simultaneously (e.g., using target 406, target 408, and target 410). For example, an initial location of positioning device 404 may position LiDAR sensor 402 at 20 m from target 406 (e.g., distance 412), 80 m from target 408 (distance 414), and 140 m from target 410 (distance 416). In some aspects, a subsequent test may relocate positioning device 404 back by 10 m such that LiDAR sensor 402 is 30 m from target 406 (e.g., distance 412), 90 m from target 408, and 150 m from target 410. In some configurations, this test procedure can be repeated (e.g., positioning device 404 can be moved) to test LiDAR sensor 402 at distances from 20 m to 200 m. That is, system 400 can test/characterize LiDAR sensor 402 over a range of distances in fewer test iterations than a system that includes a single target.

In some examples, positioning device 404 can be configured to move LiDAR sensor 402 such that different transmission beams corresponding to different channels of LiDAR sensor 402 are directed to one or more of the targets in system 400 (e.g., target 406, target 408, and/or target 410).

Figure 5:
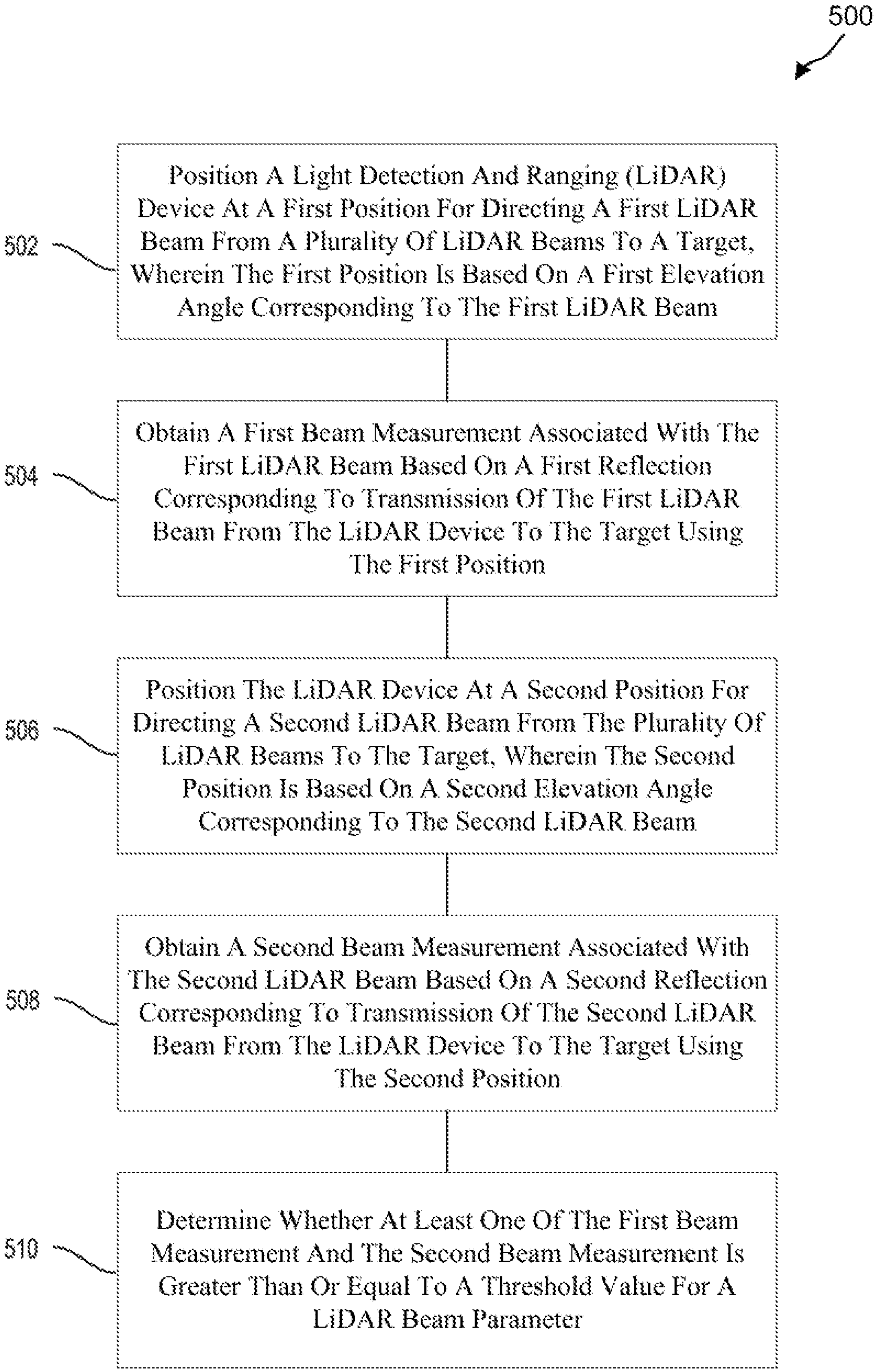
FIG. 5 illustrates a flow chart of an example process for implementing LiDAR beam-by-beam characterization, according to some examples of the present disclosure.

FIG. 5 illustrates a block diagram of an example process 500 for a beam-by-beam characterization of a LIDAR device. At step 502, the process 500 includes positioning a light detection and ranging (LiDAR) device at a first position for directing a first LiDAR beam from a plurality of LiDAR beams to a target, wherein the first position is based on a first elevation angle corresponding to the first LiDAR beam. For example, controller 224 can position LiDAR sensor 202 in a first position (e.g., illustrated in FIG. 2B) for directing LiDAR beam corresponding to channel 204*a* to target 208, wherein the first position is based on elevation angle 228*a* corresponding to channel 204*a*. In some aspects, the LiDAR device in the first position is tilted from an upright position based on the first elevation angle, wherein the first LiDAR beam is pointed in a direction that is substantially parallel to a ground plane. For instance, LiDAR sensor 202 can be tilted from an upright position based on elevation angle 228*a* such that the LiDAR beam associated with channel 204*a* is pointed in a direction that is substantially parallel to a ground plane or a horizontal axis. In some configurations, the distance between the LiDAR device and the target is greater than or equal to 150 meters. For example, distance 416 between LiDAR sensor 402 and target 410 can be greater than or equal to 150 meters. In some instances, the distance between the LiDAR device and the target can be configurable (e.g., the positioning device coupled to the LiDAR sensor and/or the target may be moveable).

In some aspects, the process 500 can include adjusting the first position of the LiDAR device based on at least one azimuth angle. For example, controller 324 can adjust the position of LiDAR sensor 302 based on an azimuth angle. In some cases, the azimuth angle can correspond to one or more beams transmitted across a horizontal plane of lens 303 (e.g., from fixed LiDAR sensor 302). In some examples, the azimuth angle can be used to rotate LiDAR sensor 302 (e.g., adjust yaw 322).

At step 504, the process 500 includes obtaining a first beam measurement associated with the first LiDAR beam based on a first reflection corresponding to transmission of the first LiDAR beam from the LiDAR device to the target using the first position. For example, controller 224 can obtain a first beam measurement associated with a reflection corresponding to the LiDAR beam transmission from channel 204*a*.

At step 506, the process 500 includes positioning the LiDAR device at a second position for directing a second LiDAR beam from the plurality of LiDAR beams to the target, wherein the second position is based on a second elevation angle corresponding to the second LiDAR beam. For example, controller 224 can position LiDAR sensor 202 in a second position (e.g., illustrated in FIG. 2C) for directing LiDAR beam corresponding to channel 204*n* to target 208, wherein the first position is based on elevation angle 228*b* corresponding to channel 204*n*. In some cases, the first elevation angle and the second elevation angle can be based on one or more calibration parameters associated with the LiDAR device. For instance, elevation angle 228*a* and/or elevation angle 228*b* can be based on calibration parameters associated with LiDAR sensor 202.

At step 508, the process 500 includes obtaining a second beam measurement associated with the second LiDAR beam based on a second reflection corresponding to transmission of the second LiDAR beam from the LiDAR device to the target using the second position. For example, controller 224 can obtain a second beam measurement associated with a reflection corresponding to the LiDAR beam transmission from channel 204*n*.

At step 510, the process 500 includes determining whether at least one of the first beam measurement and the second beam measurement is greater than or equal to a threshold value for a LiDAR beam parameter associated with operation of an autonomous vehicle. For example, controller 224 can determine whether the first beam measurement associated with channel 204*a* and/or the second beam measurement associated with channel 204*n* is greater than or equal to a threshold value for a LiDAR beam parameter. In some examples, the LiDAR beam parameter can be a parameter that is associated with operation of an autonomous vehicle (e.g., autonomous vehicle 102). In some cases, the LiDAR beam parameter can correspond to a LiDAR range requirement corresponding to a perception stack of the autonomous vehicle. For example, the LiDAR beam parameter can correspond to a LiDAR range requirement corresponding to perception stack 112 of AV 102. In some examples, the LiDAR range requirement can be based on a response time of the perception stack of the autonomous vehicle. For instance, the compute time of the perception stack and/or the speed of the autonomous vehicle can be used to determine a LiDAR range requirement.

In some examples, process 500 can include positioning the LiDAR device at a third position for directing a third LiDAR beam from the plurality of LiDAR beams to the target, wherein the third position is based on a third elevation angle corresponding to the third LiDAR beam. For example, controller 224 can position LiDAR sensor 202 in a third position (e.g., illustrated in FIG. 2A) for directing LiDAR beam corresponding to channel 204*e* to target 208, wherein the third position is based on elevation angle 226 corresponding to channel 204*e* (e.g., zero degrees).

In some aspects, process 500 can include obtaining a third beam measurement associated with the third LiDAR beam based on a third reflection corresponding to transmission of the third LiDAR beam from the LiDAR device to the target using the third position. For example, controller 224 can obtain a third beam measurement associated with a reflection corresponding to the LiDAR beam transmission from channel 204*e*.

In some cases, process 500 can include determining whether the third beam measurement is greater than or equal to the threshold value for the LiDAR beam parameter associated with operation of the autonomous vehicle. For example, controller 224 can determine whether the third beam measurement associated with channel 204*e* is greater than or equal to a threshold value for a LiDAR beam parameter associated with operation of autonomous vehicle 102.

Figure 6:
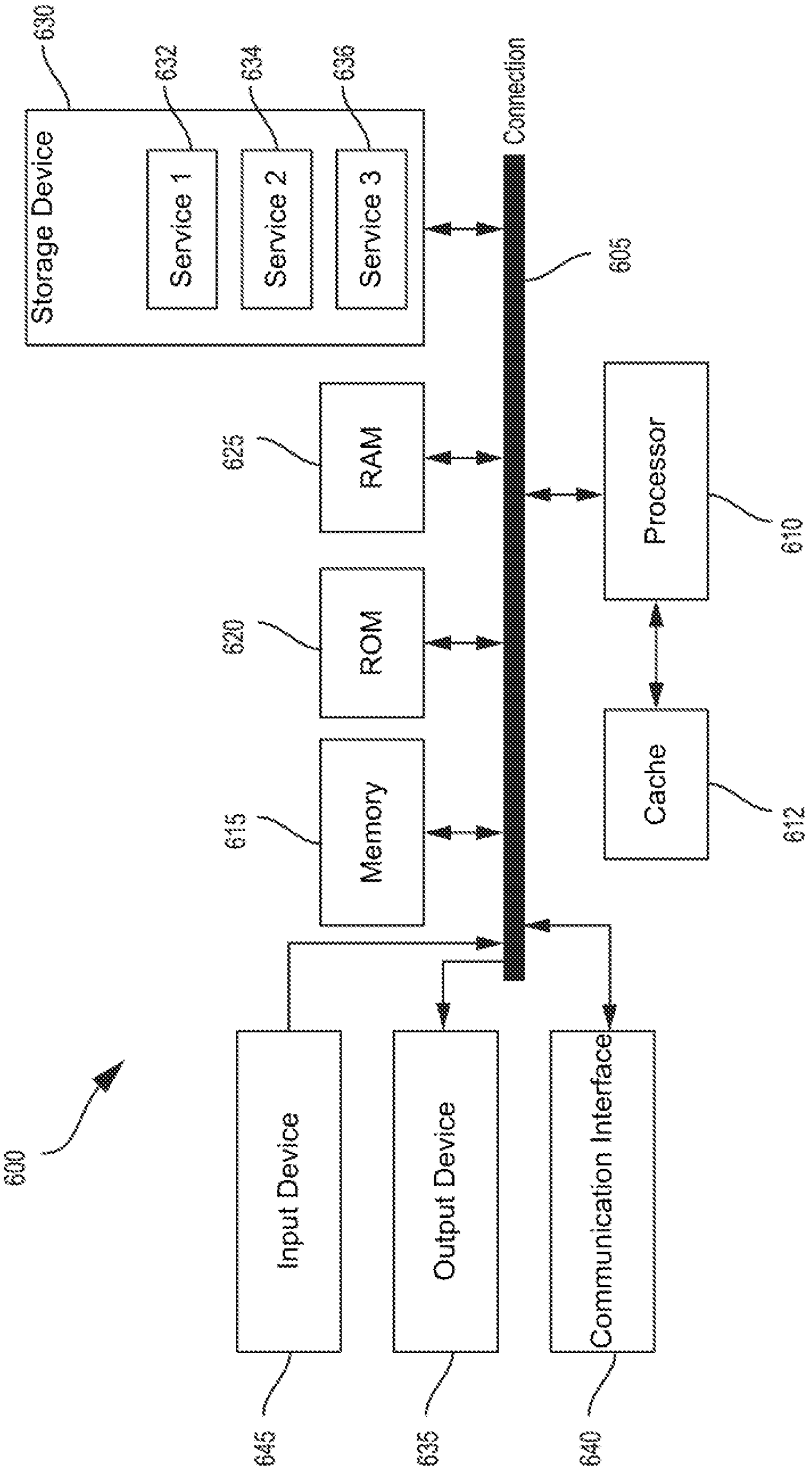
FIG. 6 is a diagram illustrating an example system architecture for implementing certain aspects described herein, according to some examples of the present disclosure.

FIG. 6 illustrates an example computing system 600 with which some aspects of the subject technology can be implemented. For example, computing system 600 can be any computing device making up internal computing system 110, remote computing system 190, a passenger device executing the ridesharing application 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some examples, computing system 600 is a distributed system in which the functions described in this disclosure can be distributed within a datacenter, multiple data centers, a peer network, etc. In some cases, one or more of the described system components represents many such components each performing some or all of the function for which the component is described. In some cases, the components can be physical or virtual devices.

Example system 600 includes at least one processing unit (CPU or processor) 610 and connection 605 that couples various system components including system memory 615, such as read-only memory (ROM) 620 and random-access memory (RAM) 625 to processor 610. Computing system 600 can include a cache of high-speed memory 612 connected directly with, in close proximity to, and/or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 can include an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 630 can include software services, servers, services, etc., that when the code that defines such software is executed by the processor 610, causes the system to perform a function. In some examples, a hardware service that performs a particular function can include the software component stored in a computer-readable medium in connection with the necessary hardware components, such as processor 610, connection 605, output device 635, etc., to carry out the function.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:

positioning a light detection and ranging (LiDAR) device at a first position for directing a first LiDAR beam of a plurality of LiDAR beams to a target, wherein the first position is based on a first elevation angle corresponding to a first channel of the LiDAR device associated with the first LiDAR beam, wherein the plurality of LiDAR beams correspond to a plurality of channels of the LiDAR device, and wherein each channel of the plurality of channels is associated with a different elevation angle, and wherein positioning the LiDAR device at the first position comprises tilting the LiDAR device based on the first elevation angle such that the first channel is aligned with the target;

obtaining a first beam measurement associated with the first LiDAR beam based on a first reflection corresponding to transmission of the first LiDAR beam from the LiDAR device to the target using the first position;

positioning the LiDAR device at a second position for directing a second LiDAR beam from the plurality of LiDAR beams to the target, wherein the second position is based on a second elevation angle corresponding to a second channel of the LiDAR device associated with the second LiDAR beam, and wherein the second elevation angle is different from the first elevation angle, and wherein positioning the LiDAR device at the second position comprises tilting the LiDAR device based on the second elevation angle such that the second channel is aligned with the target;

obtaining a second beam measurement associated with the second LiDAR beam based on a second reflection corresponding to transmission of the second LiDAR beam from the LiDAR device to the target using the second position; and determining whether at least one of the first beam measurement or the second beam measurement is greater than or equal to a threshold value for a LiDAR beam parameter.

2. The method of claim 1, further comprising:

positioning the LiDAR device at a third position for directing a third LiDAR beam from the plurality of LiDAR beams to the target, wherein the third position is based on a third elevation angle corresponding to a third channel of the LiDAR device associated with the third LiDAR beam, and wherein the third elevation angle is different from the first elevation angle and the second elevation angle, and wherein positioning the LiDAR device at the third position comprises tilting the LiDAR device based on the third elevation angle such that the third channel is aligned with the target;

obtaining a third beam measurement associated with the third LiDAR beam based on a third reflection corresponding to transmission of the third LiDAR beam from the LiDAR device to the target using the third position; and determining whether the third beam measurement is greater than or equal to the threshold value for the LiDAR beam parameter.

3. The method of claim 1, wherein the LiDAR device in the first position is tilted from an upright position based on the first elevation angle, wherein the first LiDAR beam is pointed in a direction that is substantially parallel to a ground plane.

4. The method of claim 1, wherein the first elevation angle and the second elevation angle are based on one or more calibration parameters associated with the LiDAR device.

5. The method of claim 1, further comprising:

adjusting the first position of the LiDAR device based on at least one azimuth angle.

6. The method of claim 1, wherein the LiDAR beam parameter corresponds to a LiDAR range requirement corresponding to a perception stack of an autonomous vehicle.

7. The method of claim 6, wherein the LiDAR range requirement is based on a response time of the perception stack of the autonomous vehicle.

8. The method of claim 1, wherein a distance between the LiDAR device and the target is greater than or equal to 150 meters.

9. A system comprising:

a light detection and ranging (LiDAR) device;

a positioning device coupled to the LiDAR device;

at least one memory storing instructions; and at least one processor coupled to the LiDAR device, the positioning device, and the at least one memory, wherein the instructions, when executed by the at least one processor, cause the at least one processor to:

position, via the positioning device, the LiDAR device at a first position for directing a first LiDAR beam of a plurality of LiDAR beams to a target, wherein the first position is based on a first elevation angle corresponding to a first channel of the LiDAR device associated with the first LiDAR beam, wherein the plurality of LiDAR beams correspond to a plurality of channels of the LiDAR device, and wherein each channel of the plurality of channels is associated with a different elevation angle, and wherein positioning the LiDAR device at the first position comprises tilting the LiDAR device based on the first elevation angle such that the first channel is aligned with the target;

obtain a first beam measurement associated with the first LiDAR beam based on a first reflection corresponding to transmission of the first LiDAR beam from the LiDAR device to the target using the first position;

position, via the positioning device, the LiDAR device at a second position for directing a second LiDAR beam from the plurality of LiDAR beams to the target, wherein the second position is based on a second elevation angle corresponding to a second channel of the LiDAR device associated with the second LiDAR beam, and wherein the second elevation angle is different from the first elevation angle, and wherein positioning the LiDAR device at the second position comprises tilting the LiDAR device based on the second elevation angle such that the second channel is aligned with the target;

obtain a second beam measurement associated with the second LiDAR beam based on a second reflection corresponding to transmission of the second LiDAR beam from the LiDAR device to the target using the second position; and determine whether at least one of the first beam measurement or the second beam measurement is greater than or equal to a threshold value for a LiDAR beam parameter.

10. The system of claim 9, wherein the instructions also cause the at least one processor to:

position, via the positioning device, the LiDAR device at a third position for directing a third LiDAR beam from the plurality of LiDAR beams to the target, wherein the third position is based on a third elevation angle corresponding to a third channel of the LiDAR device associated with the third LiDAR beam, and wherein the third elevation angle is different from the first elevation angle and the second elevation angle, and wherein positioning the LiDAR device at the third position comprises tilting the LiDAR device based on the third elevation angle such that the third channel is aligned with the target;

obtain a third beam measurement associated with the third LiDAR beam based on a third reflection corresponding to transmission of the third LiDAR beam from the LiDAR device to the target using the third position; and determine whether the third beam measurement is greater than or equal to the threshold value for the LiDAR beam parameter.

11. The system of claim 9, wherein the LiDAR device in the first position is tilted from an upright position based on the first elevation angle, wherein the first LiDAR beam is pointed in a direction that is substantially parallel to a ground plane.

12. The system of claim 9, wherein the first elevation angle and the second elevation angle are based on one or more calibration parameters associated with the LiDAR device.

13. The system of claim 9, wherein the LiDAR beam parameter corresponds to a LiDAR range requirement corresponding to a perception stack of an autonomous vehicle.

14. The system of claim 9, wherein a distance between the LiDAR device and the target is greater than or equal to 150 meters.

15. The system of claim 9, wherein the instructions also cause the at least one processor to:

adjust the first position of the LiDAR device based on at least one azimuth angle.

16. A non-transitory computer-readable media comprising instructions stored thereon which, when executed by a computer or processor, cause the computer or processor to:

position a light detection and ranging (LiDAR) device at a first position for directing a first LiDAR beam of a plurality of LiDAR beams to a target, wherein the first position is based on a first elevation angle corresponding to a first channel of the LiDAR device associated with the first LiDAR beam, wherein the plurality of LiDAR beams correspond to a plurality of channels of the LiDAR device, and wherein each channel of the plurality of channels is associated with a different elevation angle, and wherein positioning the LiDAR device at the first position comprises tilting the LiDAR device based on the first elevation angle such that the first channel is aligned with the target;

obtain a first beam measurement associated with the first LiDAR beam based on a first reflection corresponding to transmission of the first LiDAR beam from the LiDAR device to the target using the first position;

position the LiDAR device at a second position for directing a second LiDAR beam from the plurality of LiDAR beams to the target, wherein the second position is based on a second elevation angle corresponding to a second channel of the LiDAR device associated with the second LiDAR beam, and wherein the second elevation angle is different from the first elevation angle, and wherein positioning the LiDAR device at the second position comprises tilting the LiDAR device based on the second elevation angle such that the second channel is aligned with the target;

obtain a second beam measurement associated with the second LiDAR beam based on a second reflection corresponding to transmission of the second LiDAR beam from the LiDAR device to the target using the second position; and determine whether at least one of the first beam measurement or the second beam measurement is greater than or equal to a threshold value for a LiDAR beam parameter.

17. The non-transitory computer-readable media of claim 16, wherein the instructions also cause the computer or the processor to:

position the LiDAR device at a third position for directing a third LiDAR beam from the plurality of LiDAR beams to the target, wherein the third position is based on a third elevation angle corresponding to a third channel of the LiDAR device associated with the third LiDAR beam, and wherein the third elevation angle is different from the first elevation angle and the second elevation angle, and wherein positioning the LiDAR device at the third position comprises tilting the LiDAR device based on the third elevation angle such that the third channel is aligned with the target;

obtain a third beam measurement associated with the third LiDAR beam based on a third reflection corresponding to transmission of the third LiDAR beam from the LiDAR device to the target using the third position; and determine whether the third beam measurement is greater than or equal to the threshold value for the LiDAR beam parameter.

18. The non-transitory computer-readable media of claim 16, wherein the LiDAR device in the first position is tilted from an upright position based on the first elevation angle, wherein the first LiDAR beam is pointed in a direction that is substantially parallel to a ground plane.

19. The non-transitory computer-readable media of claim 16, wherein the first elevation angle and the second elevation angle are based on one or more calibration parameters associated with the LiDAR device.

20. The non-transitory computer-readable media of claim 16, wherein the instructions also cause the computer or the processor to:

adjust the first position of the LiDAR device based on at least one azimuth angle.

* * * * *